Figure 1:
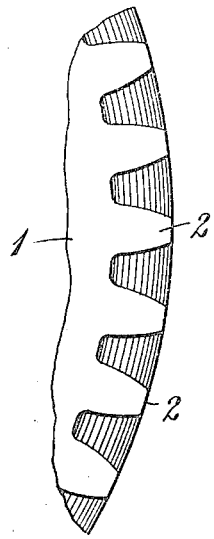

G. M. EATON.
MECHANICAL GEARING FOR TRANSMISSION OF POWER.
APPLICATION FILED JULY 2, 1913.

1,183,176.

Patented May 16, 1916.

WITNESSES:
Fred H Miller
D. H. Mace

INVENTOR
George M. Eaton
BY
Wesley G. Carr
ATTORNEY

UNITED STATES PATENT OFFICE.

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

MECHANICAL GEARING FOR TRANSMISSION OF POWER.

1,183,176.   Specification of Letters Patent.   Patented May 16, 1916.

Application filed July 2, 1913. Serial No. 776,940.

*To all whom it may concern:*

Be it known that I, GEORGE M. EATON, a citizen of the United States, and a resident of Wilkinsburg, in the county of Allegheny and State of Pennsylvania, have invented a new and useful Improvement in Mechanical Gearing for Transmission of Power, of which the following is a specification.

My invention relates to mechanical gearing for the transmission of power and it has special reference to gears, pinions or racks that are adapted to transmit large amounts of power.

The object of my invention is to provide a gear, or the like, having teeth of a configuration and arrangement adapted to effect a uniform and smooth transmission of power, and which shall be strong and durable in construction, effective in operation and which, if desired, may be readily produced by continuous cutting strokes across the full face of the gear.

More specifically, the object of my invention is to provide a gear having overlapped symmetrically disposed teeth which, in development, are either of continually varying curvature, such as parabola, hyperbola, ellipse, epicycloid, or the like, or of a compound curvature. In employing the term "compound curvature" I refer to plane curves comprising various portions having different radii of curvature.

Heretofore, herring-bone gears, having overlapping straight-line teeth, have been employed and have operated effectively and satisfactorily, but they are expensive and difficult to manufacture, inasmuch as such gears are usually composed of two supplemental parts which are cut separately and bolted or otherwise secured together. In certain cases, herring-bone gears are made in a single structure, but, in order to permit of cutting the teeth, it is necessary to provide an annular groove around the middle portion of the gear to allow the cutting tool to run out. With this type of gear, a portion of the width is ineffective for the transmission of power, which is an undesirable feature. It has also been proposed to employ teeth of circular outlines, which may be readily cut by continuous strokes, but which fail to adequately meet the requirements of gears adapted to transmit large amounts of power for the reason that, if the curvature of the teeth is made sufficiently slight to secure the requisite strength at the ends thereof, the teeth do not overlap sufficiently to be of service in effecting a smooth and uniform transmission of power, whereas, if the curvature be sufficiently great to permit the desired overlapping of the teeth, the end portions thereof meet the edge of the gear at an angle which produces very thin and weak tips. Such a construction is undesirable because the wear of the teeth starts at the outer ends, particularly when the pinion or gear is overhung beyond its shaft bearing.

According to my invention, I propose to combine the advantageous features of the herring-bone and circular toothed gear and to eliminate the inferior points of their design and construction.

I shall describe my invention as an article of manufacture and irrespective of the manner in which it may be produced. It should, however, be understood that the teeth may conveniently be cast or preferably cut by means of a machine which is adapted to move the cutting tool in a continuous sweeping stroke of the required curvature across the face of the gear.

Figure 2:
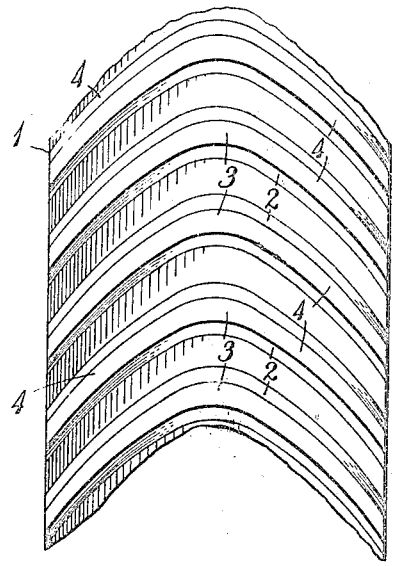

In the accompanying drawing, Figure 1 is a view in side elevation of a portion of a gear constructed in accordance with my invention, and Fig. 2 is a development of a portion of the gear showing the curvature of the teeth and their relation to each other.

Referring to the drawing, a gear body 1 of any common form is provided with a plurality of correspondingly disposed continuous teeth 2 which may be either of compound or of varying curvature, and are symmetrical in configuration with respect to the median plane of the gear. The teeth 2 are preferably of the usual involute type and have their portions 3 of maximum curvature in substantially the median plane of the gear, the end portions 4 thereof being of materially less curvature and meeting the edges of the gear at angles which are sufficiently great to permit of strength and durability. As has already been stated, the particular configuration or curvature of the teeth 2 may be either compound, that is, made up of several circular sections of different radii, or of the continually varying curvature, such as the parabola, hyperbola, etc. I do not wish to be restricted to any of the forms mentioned, as I intend to cover teeth of a configuration which departs from a single circular arc, straight lines, or a combination of both.

The total curvature of the teeth is such that a line joining the extremities of the end portions 4 of any one tooth cuts one of the adjacent teeth and, furthermore, is substantially tangent to the point of maximum curvature of the second adjacent tooth. This particular relationship of parts is not essential, and variations in the total curvature are contemplated. Moreover, the teeth are preferably so shaped throughout their entire length that all sections thereof, cut by planes parallel to the median plane of the gear, are identical.

During one direction of operation of two companion gears, the teeth come into engagement first at their end portions 4, after which the point of contact moves inward toward the center portions 3 of maximum curvature. Moreover, before one set of coöperating teeth becomes disengaged, the set adjacent thereto makes contact with one another and take up a portion of the load, so that the transmission of power is continuous and uniform, in the same manner as is obtained with herring-bone gears.

My proposed gears, therefore, are adapted to transmit power smoothly throughout the entire length of the teeth and without end thrust, and, at the same time, the curvature thereof is such that the requisite strength and durability of the end portions of the teeth is secured. Besides embodying the advantageous features just recited, teeth of the shape and type set forth may be conveniently cut by a suitable machine which is adapted to move the cutting tool in a continuous sweeping stroke across the face of the gear.

Modifications in the structural details and arrangement and location of parts may be made without departing from the spirit and scope of my invention, and I desire that only such limitations shall be imposed as are indicated in the appended claims.

I claim as my invention:

1. A gear embodying a plurality of teeth adapted to mesh with similar teeth, each tooth having different finite radii of curvature at various portions thereof.

2. A gear having a plurality of teeth that are adapted to mesh with similar teeth and are of continually varying curvature.

3. A gear having a plurality of overlapping teeth adapted to mesh with similar teeth and being of continually varying curvature.

4. A gear having a plurality of symmetrically disposed continuous teeth of continually varying curvature and adapted to mesh with similar teeth.

5. A gear having a plurality of correspondingly placed continuous and symmetrical peripheral teeth of continually varying curvature, the maximum curvature being substantially in the middle portion of the gear.

6. A gear having a plurality of continuous teeth that are adapted to mesh with similar teeth and are of continually varying curvature.

7. A gear having a plurality of symmetrically curved peripheral teeth of compound curvature.

8. A gear having a plurality of continuous symmetrically curved teeth of compound curvature, having the maximum curvature substantially in the central plane of the gear.

9. A gear having a plurality of correspondingly disposed continuously curved teeth of compound curvature that are adapted to mesh with similar teeth the centers of curvature being on the same side of the tooth curve.

10. A gear having a plurality of correspondingly disposed teeth of continually varying curvature, that are adapted to mesh with similar teeth, the ends of the teeth overlapping the central portions of the adjacent teeth.

11. A gear having a plurality of correspondingly disposed symmetrically curved teeth of compound curvature having the maximum curvature in the central plane of the gear.

12. A gear having a plurality of correspondingly disposed continuous and symmetrically curved teeth of compound curvature, said teeth having their maximum curvatures in substantially the central plane of the gear and overlapping one another.

13. A gear having a plurality of correspondingly disposed teeth adapted to mesh with similar teeth, the said teeth having central portions of maximum curvature and symmetrically disposed end portions of materially less curvature, the teeth being so located that a line joining the extremities of the end portions of each tooth cuts the adjacent tooth.

14. A gear embodying a plurality of peripheral teeth, each of which has different finite radii of curvature at various portions thereof, the centers of such curvature being all on one side of the tooth curve.

15. A gear having a plurality of peripheral teeth of continually varying curvature, the centers of such curvature being all on one side of the tooth curve.

In testimony whereof, I have hereunto subscribed my name this 27th day of June, 1913.

GEORGE M. EATON.

Witnesses:
H. D. JAMES,
B. B. HINES.